(12) United States Patent
Wei et al.

(10) Patent No.: US 8,680,769 B2
(45) Date of Patent: Mar. 25, 2014

(54) LIGHT-EMITTING-DIODE (LED) PROTECTION CIRCUIT

(75) Inventors: Tao-Chin Wei, Taipei (TW); Kuo-Yi Yu, Taipei (TW)

(73) Assignees: Midas Wei Trading Co., Ltd., Taipei (TW); Champion Elite Company Limited, Tortola (VG)

( * ) Notice: Subject to any disclaimer, the term of this patent is extended or adjusted under 35 U.S.C. 154(b) by 107 days.

(21) Appl. No.: 13/313,488

(22) Filed: Dec. 7, 2011

(65) Prior Publication Data

US 2012/0194077 A1    Aug. 2, 2012

(30) Foreign Application Priority Data

Jan. 31, 2011   (TW) .............................. 100103638 A (51) Int. Cl.
*H05B 39/10*    (2006.01)
*H02H 5/04*    (2006.01)

(52) U.S. Cl.
USPC ...... 315/90; 315/119; 315/185 R; 315/209 R; 361/56; 361/104

(58) Field of Classification Search
USPC ........... 315/90, 113, 211, 122, 186, 119, 192, 315/185 R, 209 R, 247; 361/56, 104, 249.02
See application file for complete search history.

(56) References Cited

U.S. PATENT DOCUMENTS

| | | | |
|---|---|---|---|
| 2009/0109591 A1* | 4/2009 | Li et al. .......................... | 361/104 |
| 2009/0323238 A1* | 12/2009 | Gehrke .......................... | 361/56 |
| 2011/0062871 A1* | 3/2011 | Chen et al. .................... | 315/121 |
| 2011/0273098 A1* | 11/2011 | Grajcar .......................... | 315/186 |
| 2013/0114169 A1* | 5/2013 | Werner et al. .................. | 361/56 |

* cited by examiner

*Primary Examiner* — Vibol Tan
(74) *Attorney, Agent, or Firm* — Muncy, Geissler, Olds & Lowe, P.C.

(57) ABSTRACT

A light-emitting-diode (LED) protection circuit, comprising: a light-emitting-diode module; two fuse elements, connected respectively to said LED module; and a discharge protection element, connected to said LED module and said two fuse elements. When current flowing through said fuse element exceeds a current protection value, said fuse element will turn into an open circuit state, to cut off an over current and prevent it from flowing to said LED module to avoid damages. In addition, when instantaneous high voltage occurs, such as incurred by a spike or a lightning, said discharge protection element can be used as an over current discharge route, to provide said LED module with a current bypass route.

19 Claims, 8 Drawing Sheets

LIGHT-EMITTING-DIODE (LED) PROTECTION CIRCUIT

BACKGROUND OF THE INVENTION

1. Field of the Invention

The present invention relates to a light-emitting-diode (LED) protection circuit, and in particular to a multi-function protection circuit of Over Voltage Protection (OVP), Over Current Protection (OCP), Over Temperature Protection (OTP), and Lightning Protection, realized through using fuse elements and discharge protection elements.

2. The Prior Arts

Nowadays, due to the ever increasing price of oil, the ample supply of energy resources and materials is an important issue, therefore, how to conserve consumption of energy and materials is a major target of Industries. Wherein, the energy used by the illumination devices occupies quite a large percentage of total energy consumption, thus it is now an important item for energy conservation. Compared with the conventional incandescent light bulb and fluorescent light tube, the light-emitting-diode has various advantages, such as compact size (multiple units, multiple combinations), low heat generation (low heat radiation), low electricity consumption (low starting voltage and current), long service life (more than 100,000 hours), fast response speed (can be operated at high frequency), environment friendly (shock proof, not easy to be broken upon impact, recoverable, and pollution free), so that it can be packaged in a planar way, and is easy to be made into products of light weight, compact size, and thin profile. As such, with the increased brightness and reduced cost of LED, it now has wider scope of applications, such that it can be used widely in various illumination devices, such as white light illumination device, indication lamps, vehicle signal lights, vehicle head lights, flashing light, backlight module of liquid crystal display (LCD), light source of projector, and outdoor displaying units.

Presently, most of the power used by the electrical appliances and electronic products is supply by the Local Power Company, and that is transmitted through transmission lines made of metal, as such it is very likely to be stricken by lightning. In addition to its over current, the high voltage incurred usually is the main reason for causing damages to the electrical appliances and electronic products. In this respect, an LED product is taken as an example for explanation, that is driven by AC power supply (local Utility power), and during which instantaneous over current is likely to be produced by instantaneous high voltage (spike), thus damaging the LED products and reducing its service life.

Therefore, presently, the problem of how to protect LED products from being damaged by Over Current, Over Voltage, Over Temperature, spike, and lightning is an urgent task, that has to be solved in this field.

SUMMARY OF THE INVENTION

In view of the problems and shortcomings of the prior art, the present invention discloses an LED protection circuit, so as to overcome the problems of the prior art effectively.

A major objective of the present invention is to provide an LED protection circuit, that is capable of protecting the electronic products utilizing LED from being damaged by over voltage, over current, over temperature, or lightning spike, hereby increasing reliability and service life of the electronic products.

To achieve the objective mentioned above, the present invention provides an LED protection circuit, comprising: an LED module; two fuse elements, connected respectively to the LED module, and that are in an open circuit state when current flowing through exceeds a current protection value, to shut off the over current flowing to the LED module; and a discharge protection element, connected to the LED module and two fuse elements, to provide a current bypass route for the LED module.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
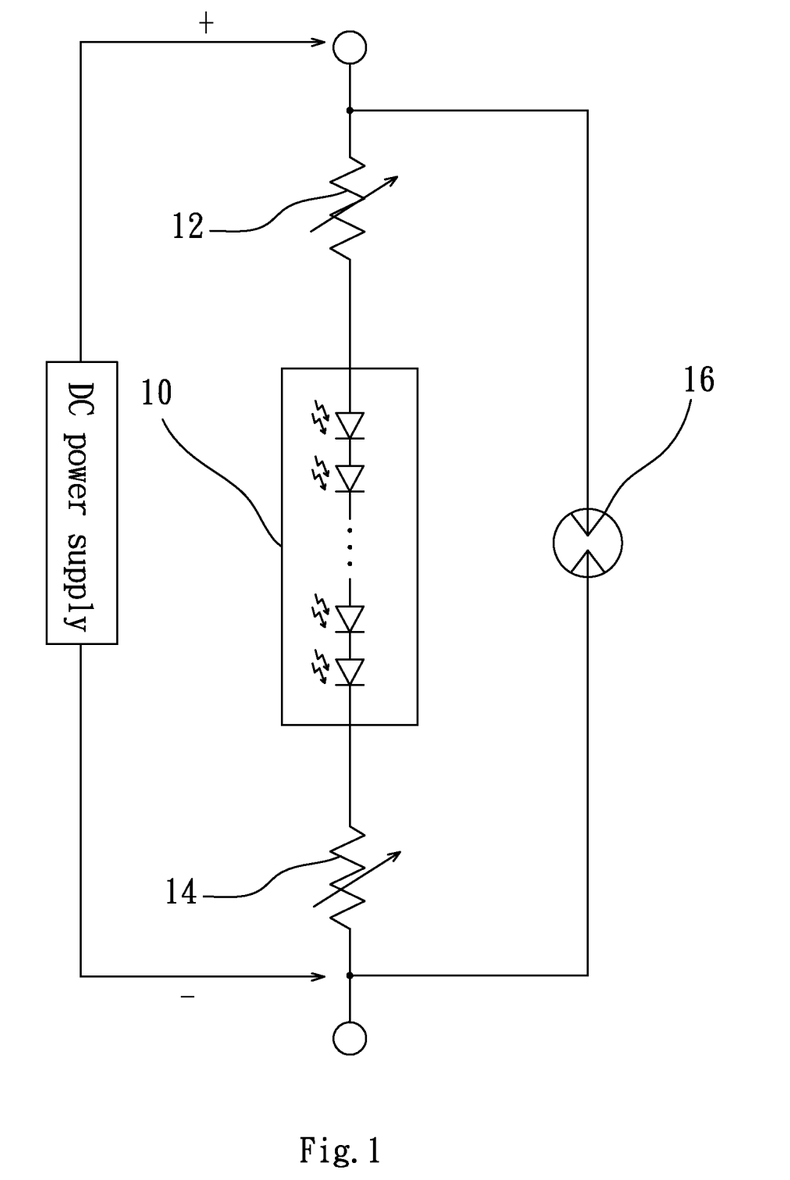
FIG. 1 is an LED protection circuit operated through using a DC power supply according to a first embodiment of the present invention.

In the present invention, the LED protection circuit is operated through using an AC power supply or a DC power supply, and it is capable of avoiding damages due to the over current, over voltage, over temperature, spike, or lightning incurred while using these power supplies. In the present Embodiment, an LED protection circuit operated through using a DC power supply is taken as an example for explanation. Refer to FIG. 1 for an LED protection circuit operated through using a DC power supply according to a first embodiment of the present invention, which can be used for LED illumination or backlight display of an electronic device. As shown in FIG. 1, the LED protection circuit includes an LED module 10; two fuse elements, composed of a first fuse element 12, and a second fuse element 14; and a discharge protection element 16.

In the description mentioned above, the LED module 10 includes: a plurality of light-emitting-diodes connected in series, to form an LED light string; or a plurality of LED light strings connected in parallel. The two ends of the first fuse element 12 are connected respectively to a positive end of a DC power supply, and a positive end of the LED module 10; while the two ends of the second fuse element 14 are connected respectively to a negative end of the DC power supply, and a negative end of the LED module 10. Wherein, the first fuse element 12 and the second fuse element 14 are preferably resettable electronic fuses, also referred to as polymer Positive Temperature Coefficient (PTC) fuses, composed of polymer and conductive particles, such that the conductive particles form into a chain shape conduction path in polymer after special processing. The two ends of the discharge protection element 16 are connected respectively to a positive end and negative end of the DC power supply.

When a normal operation current passes through the first fuse element 12 and the second fuse element 14, they are able to maintain low impedance to make the LED module 10 operate normally. When either over current or over voltage occurs and passes through the first fuse element 12 and the second fuse element 14, it will produce heat according to an equation, heat energy=current×voltage ($E=I^2R$), and a part of or all the heat generated will be dissipated into the air. In other words, when an over current passes through the first fuse element 12, and it exceeds a current protection value, the heat generated is greater than the heat dissipated, thus it will activate a protection mode to present an open circuit state, and it will cut off the over current and prevent it from flowing to the LED module 10. In other words, the heat produced by the over current will make the polymer to inflate and expand rapidly to break up the conduction route formed by the conductive particles, so that the resettable electronic fuse is in a high impedance state (open circuit state), to prevent the LED module 10 from being damaged. In the present invention, the advantages of using the resettable electronic fuse is that, when the over current has passed through (the hyper temperature state) and disappeared, the polymer will cool off, and its volume will return to normal, thus the conductive particles contained therein will form into a conduction route again, to present the initial low impedance, so that it can be used again.

Moreover, when spikes or lightning occurs, the over current produced by the instantaneous high voltage will sneak to the positive end of a DC power supply directly (in case a positive lightning stroke occurs), or it will sneak from ground to negative end of the DC power supply (in case a negative lightning stroke occurs). Since two ends of the discharge protection element 16 are connected to the positive end and the negative end of the DC power supply respectively, so that when the discharge protection element 16 is not activated, it is in a high impedance state, and when over voltage occurs, it can be turned into a low impedance state instantaneously, to be turned into a discharge route for over current, to provide the LED module 10 with a current bypass route, thus providing full protection for LED module 10. Wherein, the discharge protection element 16 is preferably a mini surge absorber (BLSA), having both the advantages of a ceramic gas discharge tube and a semiconductor over voltage protector: high insulation impedance, low capacitance between electrodes, larger discharge current (reaching 3 kA at maximum), bi-directional symmetry, fast speed response (lagging phenomenon of impact breakthrough does not exist), stable and reliable performance, lower post-conduction voltage, high DC breakthrough voltage (5000V at maximum), compact size, and long service life.

Figure 2:
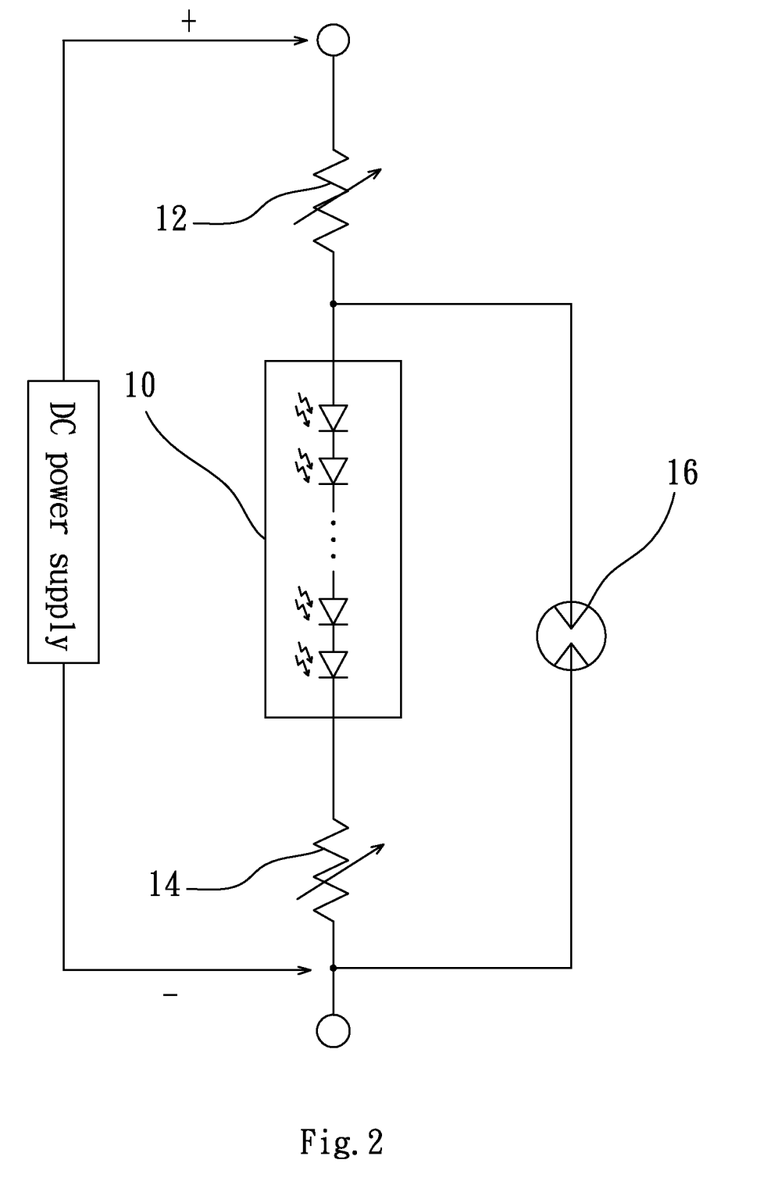
FIG. 2 is an LED protection circuit operated through using a DC power supply according to a second embodiment of the present invention.

Refer to FIG. 2 for an LED protection circuit operated through using a DC power supply according to a second embodiment of the present invention. The similarities of this embodiment to that of FIG. 1 will not repeated here for brevity, however their difference is the way of connection of the discharge protection element 16, such that one end of the discharge protection element 16 is connected between the first fuse element 12 and the positive end of the LED module 10; while the other end is connected to negative end of the DC power supply. The purpose of this way of connection is that, when the positive lightning stroke occurs, an instantaneous high voltage will act across the LED module 10, at this time, the discharge protection element 16 will jump from a high impedance state to a low impedance state, and it discharges the over current produced by the positive lightning stroke directly to the ground, to effectively shunt off the over current. In addition, the high voltage produced by the positive lightning stroke will activate the discharge protection element 16, meanwhile, an over current will flow through the first fuse element 12, and when the magnitude of this current is greater than a protection current value, the first fuse element 12 will activate a protection mode. Also, due to the acute reaction of impedance value of the first fuse element 12 to the temperature, therefore, the high temperature produced by the over current will make its impedance jump instantaneously to a high impedance state, thus directly limiting over current from flowing to the LED module 10 and the discharge protection element 16, in achieving the objective of protecting both of them.

Figure 3:
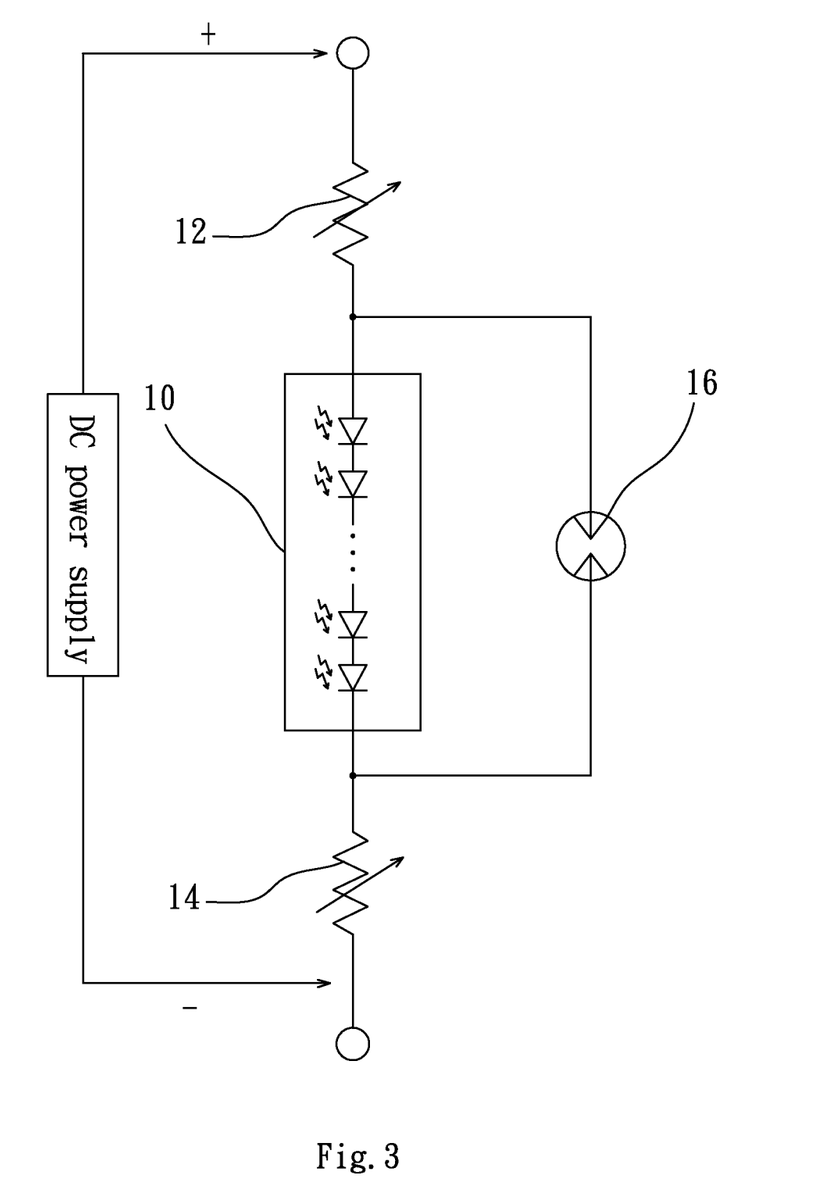
FIG. 3 is an LED protection circuit operated through using a DC power supply according to a third embodiment of the present invention.

Then, refer to FIG. 3 for an LED protection circuit operated through using a DC power supply according to a third embodiment of the present invention. The similarities of this embodiment to that of FIG. 1 will not repeated here for brevity, however their difference is the way of connection of the discharge protection element 16, such that one end of the discharge protection element 16 is connected between the first fuse element 12 and a positive end of the LED module 10; while the other end is connected between the second fuse element 14 and the negative end of the LED module 10. Therefore, regardless of the positive lightning stroke or negative lighting stroke that occurs, the over current produced by the instantaneous high voltage will sneak directly to the positive end or negative end of the DC power supply. At this time, the discharge protection element 16 will be in a short circuit state to discharge the over current, so that the over current will not flow through the LED module. Meanwhile, the current flowing through the first fuse element 12 or the second fuse element 14 is greater than the current protection value, so either of them will activate a protection mode. By way of example, when a positive lightning stroke occurs, an instantaneous high voltage will make the discharge protection element 16 to be in a short circuit state to discharge the over current, so that the over current will not flow into the LED module 10, thus protecting it from being damaged. Meanwhile, the over current produced by the instantaneous high voltage will flow through the first fuse element 12, to turn it into a open circuit state, so as to protect the LED module 10 from being damaged by over voltage or over current. Also, when a negative lightning stroke occurs, the discharge protection element 16 will first perform discharge protection; and at this time, the second fuse element 14 is turned into an open circuit state, to protect the LED module 10 from being damaged by over voltage or over current.

In the description mentioned above, in situations of using the DC power supply, the second fuse element 14 can be an ordinary fuse, the purpose for this is that: when the resettable electronic fuse is utilized in negative temperature, its current protection value will increase along with the decrease of temperature, thus its effectiveness is reduced. Therefore, an ordinary fuse can be used to compensate for the shortcomings of a resettable electronic fuse operating in negative temperature.

Figure 4:
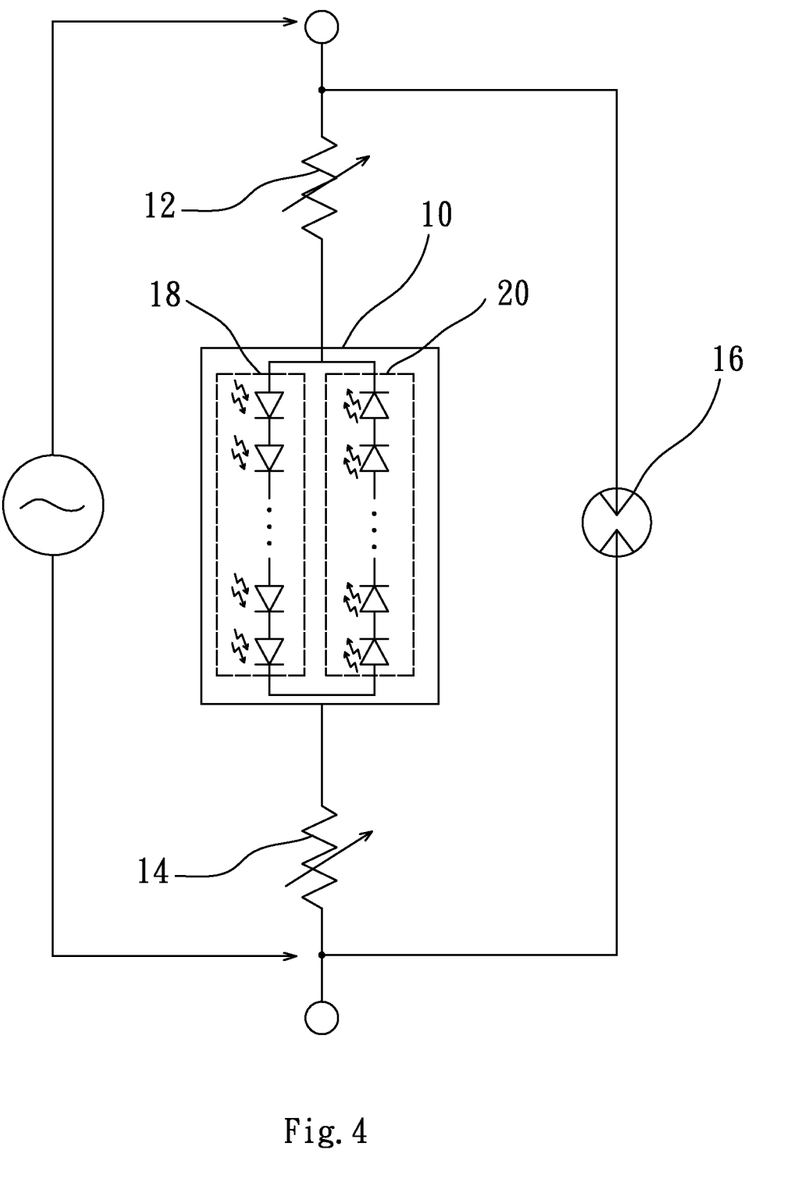
FIG. 4 is an LED protection circuit operated through using an AC power supply according to a fourth embodiment of the present invention.

Subsequently, refer to FIG. 4 for an LED protection circuit operated through using an AC power supply according to a fourth embodiment of the present invention, which can be used for LED illumination or backlight display of an electronic device. As shown in FIG. 4, the LED protection circuit includes an LED module 10; two fuse elements, composed of a first fuse element 12, and a second fuse element 14; and a discharge protection element 16. The LED module 10 includes: the parallel connection of a plurality of the first polarity light-emitting-diodes 18 connected in series, and a plurality of the second polarity light-emitting-diodes 20 connected in series, with the polarity of the first polarity light-emitting-diode 18 opposite to that of the second polarity light-emitting-diode 20. Two ends of the first fuse element 12 are connected respectively to a positive end of an AC power supply and the LED module 10, the two ends of the second fuse element 14 are connected respectively to a negative end of an AC power supply and an LED module 10, and two ends of the discharge protection element 16 are connected to a positive end and a negative end of an AC power supply.

Now, the way of circuit operation under normal condition is first described. When the positive voltage reference point of an AC current input is in a positive direction, and the current is a normal operation current, then the current flows in sequence through the first fuse element 12, the first polarity light-emitting-diodes 18 of the LED module 10, and the second fuse element 14; at this time, the first fuse element 12 and the second fuse element 14 are kept at very low impedance value, so that the first polarity light-emitting-diodes 18 may operate normally (normal lights ignition). When the positive voltage reference point of an AC current input is in a negative direction, and the current is a normal operation current, then the current flows in sequence through the second fuse element 14, the second polarity light-emitting-diodes 20 of the LED module 10, and the first fuse element 12; at this time, the first fuse element 12 and the second fuse element 14 are kept at very low impedance value, so that the second polarity light-emitting-diodes 20 may operate normally.

Figure 5:
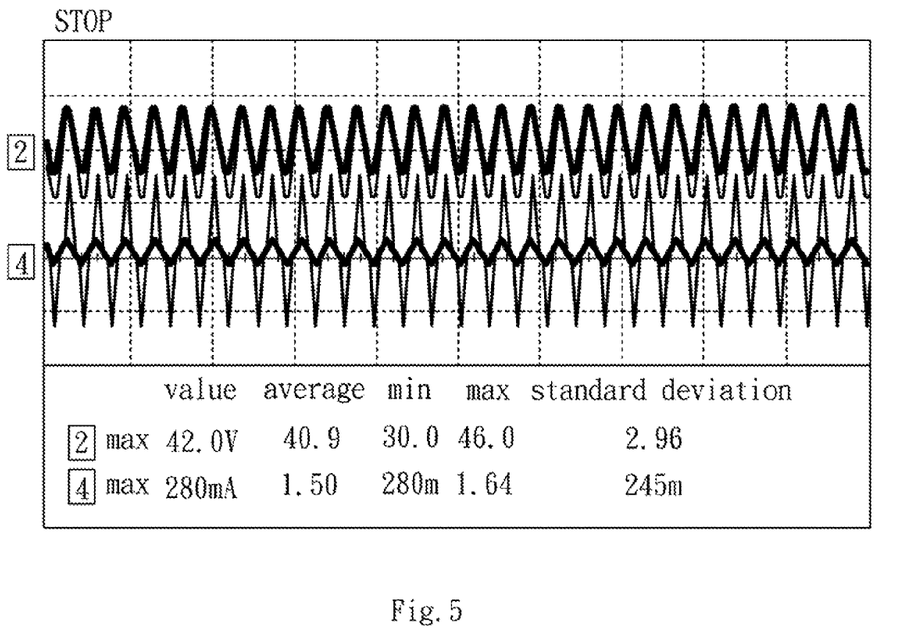
FIG. 5 is oscilloscope waveforms measured after over current protection.

In other words, when either an over current or an over voltage occurs or both occur, since AC power supply drives the first polarity light-emitting-diodes 18 and the second polarity light-emitting-diodes 20 alternatively, so that the when an over current passes through the first fuse element 12 and the second fuse element 14, and it is greater than a current protection value, the heat generated by them will be greater than the heat dissipated into the air, such that they will activate protection modes respectively, to be in an open circuit state, so as to cut off the over current and prevent it from flowing to the LED module 10. Then, refer to FIG. 5 for oscilloscope waveforms measured after going through the over current protection, for realizing effects of preventing damage to the LED modules 10. When the current finishes flowing through, the first fuse element 12 and the second fuse element 14 return again to the initial low impedance state to offer continued protection against over current and over voltage.

Figure 6:
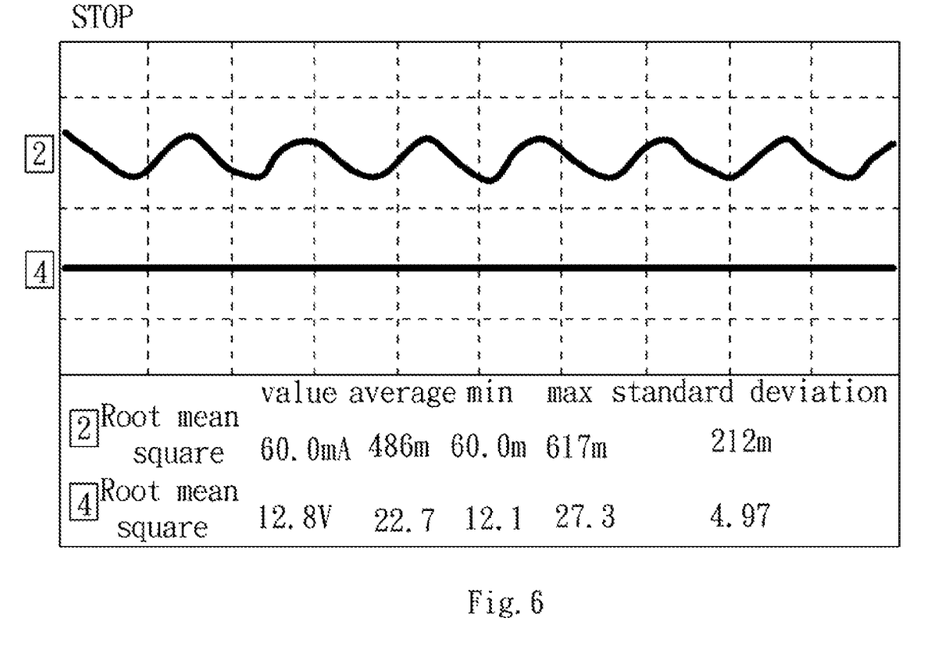
FIG. 6 is oscilloscope waveforms measured after going through over voltage protection.

In addition, when spikes or lightning occurs, the over current produced by the instantaneous high voltage will sneak to the positive end of the AC power supply directly (in case a positive lightning stroke occurs), or it will sneak from ground to negative end of AC power supply (in case a negative lightning stroke occurs). Since two ends of the discharge protection element 16 are connected to the positive end and negative end of the AC power supply respectively, so that when the discharge protection element 16 is not activated, it is in a high impedance state, and when over voltage occurs, it can be turned into a low impedance state instantaneously, to be turned into a discharge route for the over current, so as to provide the LED module 10 with a current bypass route. Refer to FIG. 6 for oscilloscope waveforms measured after going through the over voltage protection. From the drawing it can be known that, after performing current discharge, current in the discharge protection element 16 approaches zero, thus providing full protection for the LED module.

Figure 7:
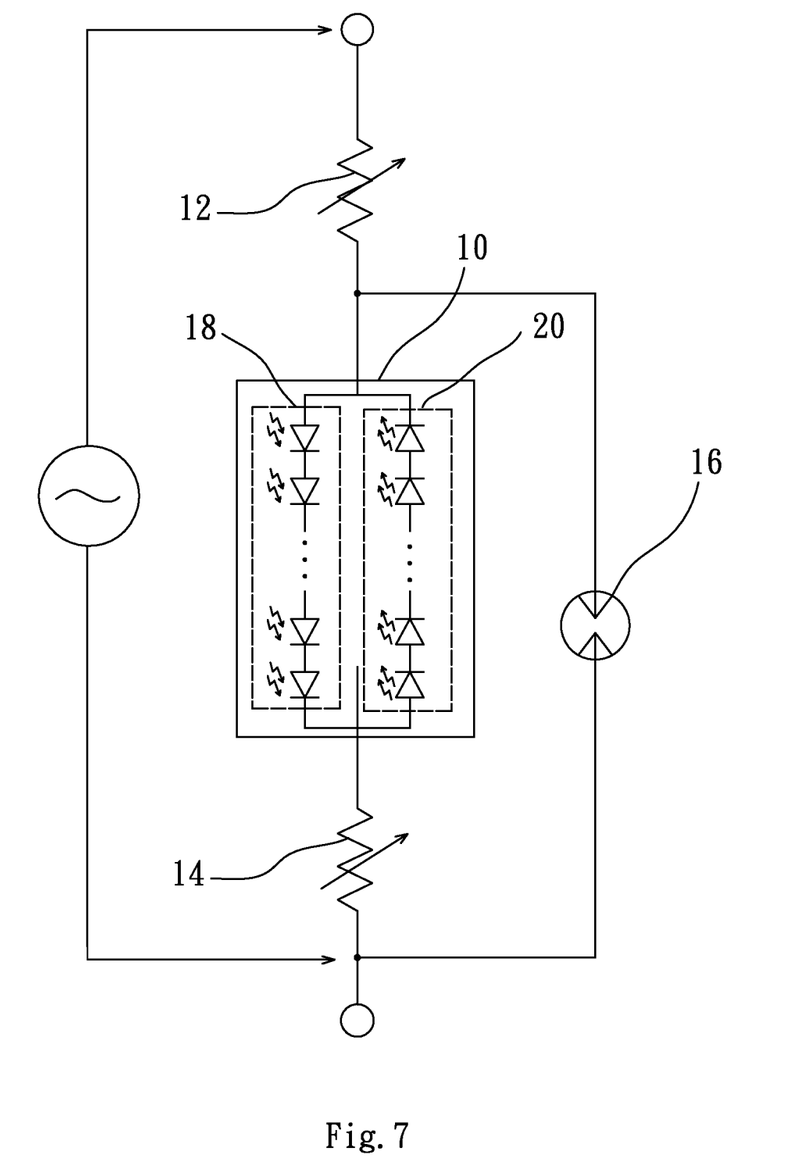
FIG. 7 is an LED protection circuit operated through using an AC power supply according to a fifth embodiment of the present invention.

Then, refer to FIG. 7 for an LED protection circuit operated through using an AC power supply according to a fifth embodiment of the present invention. The similarities of this embodiment to that of FIG. 4 will not repeated here for brevity, however their difference is the way of connection of the discharge protection element 16, such that one end of the discharge protection element 16 is connected between the first fuse element 12 and the LED module 10, while the other end is connected to negative end of the AC power supply. The purpose of this way of connection is that, when a positive lightning stroke occurs, an instantaneous high voltage will act across the first polarity LEDs 18 of the LED module 10, meanwhile the second polarity LEDs 20 will not be ignited due to the input reverse bias, at this time the discharge protection element 16 will be turned instantaneously from a high impedance state to a low impedance state, meanwhile the first polarity LEDs 18 will be turned off due to the low impedance of the discharge protection element 16, and the over current produced by the positive lightning stroke will be discharged directly to ground through the discharge protection element 16, then after passing through of the positive lightning stroke or the over current, the original AC power supply will resume driving the first polarity LEDs 18 and the second polarity LEDs 20 alternatively, in achieving protecting these LED modules from being damaged by the positive lightning stroke or the over current. In addition, the high voltage produced by the positive lightning stroke will act upon the discharge protection element 16 to turn it into action, meanwhile over current will pass through the first fuse element 12, and when the magnitude of this current is greater than a current protection value, the first fuse element 12 will activate a protection mode. Also, due to the acute reaction of impedance value of the first fuse element 12 to the temperature, therefore, the high temperature produced by the over current will make its impedance jump instantaneously to a high impedance state, thus directly limiting over current from flowing to the LED module 10 and the discharge protection element 16, in achieving the objective of protecting both of them.

Figure 8:
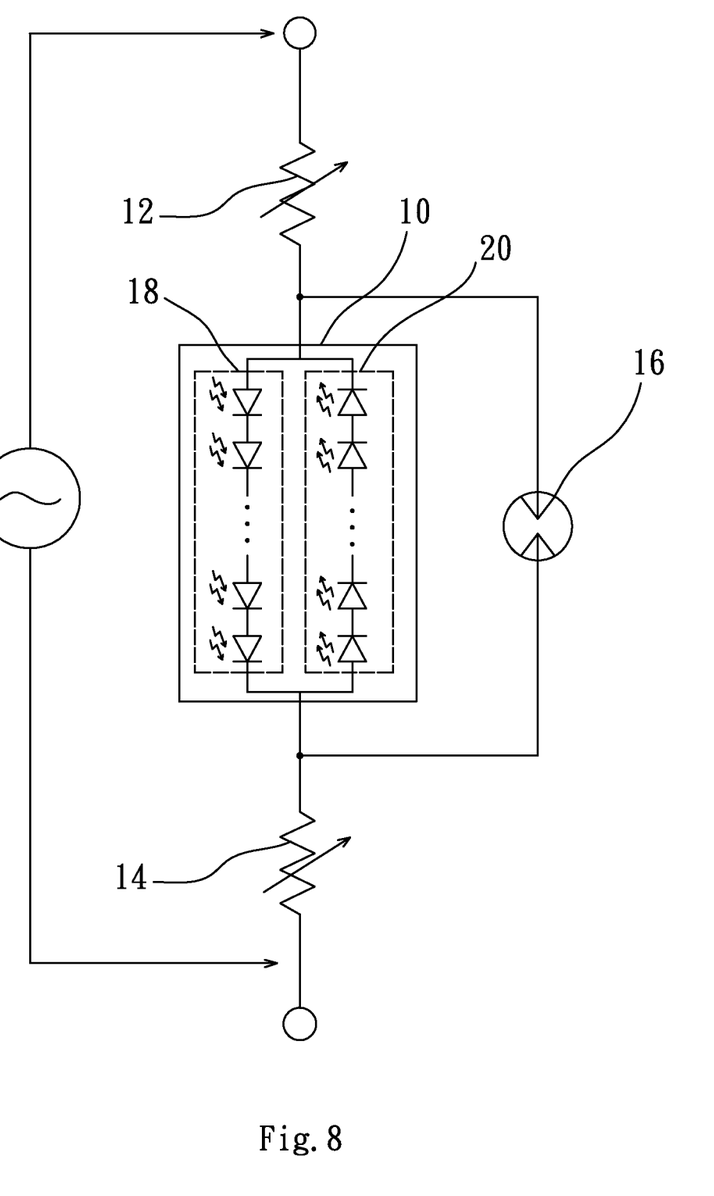
FIG. 8 is an LED protection circuit operated through using an AC power supply according to a sixth embodiment of the present invention.

Finally, refer to FIG. 8 for an LED protection circuit operated through using an AC power supply according to a sixth embodiment of the present invention. The similarities of this embodiment to that of FIG. 4 will not repeated here for brevity, however their difference is the way of connection of the discharge protection element 16, such that one end of the discharge protection element 16 is connected between the first fuse element 12 and the LED module 10, while the other end is connected between the second fuse element 14 and the LED module 10. Therefore, regardless of the positive lightning stroke or negative lighting stroke that occurs, the over current produced by the instantaneous high voltage will sneak directly to the positive end or negative end of the DC power supply. At this time, the discharge protection element 16 is in a short circuit state to discharge the over current, such that the over current will not pass through the LED module 10. Meanwhile, when the over current passing through either the first fuse element 12 or the second fuse element 14 is greater than the current protection value, then either of them will activate a protection mode. By way of example, when a positive lightning stroke occurs, an instantaneous high voltage will make the discharge protection element 16 to be in a short circuit state to discharge the over current, so that the over current will not flow into the LED module 10, thus protecting it from being damaged. Meanwhile, the over current produced by the instantaneous high voltage will flow through the first fuse element 12, to turn it into a open circuit state, so as to protect the LED module 10 from being damaged by over voltage or over current. When a negative lightning stroke occurs, the discharge protection element 16 will first perform the discharge protection, meanwhile, the second fuse element 14 it turned into an open circuit state, to protect the LED module 10 from being damaged by over voltage or over current.

Summing up the above, in the present invention, the fuse elements and discharge protection elements are used to achieve a multi-function protection circuit capable of over voltage, over current, over temperature, and lightning protections.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A light-emitting-diode (LED) protection circuit, comprising:
   a light-emitting-diode module;
   two fuse elements, connected respectively to said LED module, when current flowing through is greater than a current protection value, said two fuse elements are in an open circuit state, to cut off an over current and prevent it from flowing to said LED module; and
   a discharge protection element, connected to said LED module and said two fuse elements, said discharge protection element providing a current bypass route for said LED module;
   wherein said two fuse elements are a first fuse element and a second fuse element respectively, two ends of said first fuse element are connected respectively to a positive end of a DC power supply and a positive end of said LED module, two ends of said second fuse element are connected respectively to a negative end of said DC power supply and a negative end of said LED module, and two ends of said discharge protection demerit are connected respectively to said positive end and said negative end of said DC power supply.

2. The light-emitting-diode (LED) protection circuit as claimed in claim 1, wherein
   one end of said discharge protection element is connected between said first fuse element and said positive end of said LED module, while other end is connected to said negative end of said DC power supply.

3. The light-emitting-diode (LED) protection circuit as claimed in claim 1, wherein
   one end of said discharge protection element is connected between said first fuse element and said positive end of said LED module, while other end is connected between said second fuse element and said negative end of said LED module.

4. The light-emitting-diode (LED) protection circuit as claimed in claim 1, wherein said first fuse element is an ordinary fuse or a resettable electronic fuse, and said second fuse element is a resettable electronic fuse.

5. The light-emitting-diode (LED) protection circuit as claimed in claim 1, wherein when said LED module is operated through using an AC power supply, it includes a plurality of first polarity LEDs and a plurality of second polarity LEDs connected in parallel, with a polarity of said first polarity LED opposite to that of said second polarity LED.

6. A light-emitting-diode (LED) protection circuit, comprising:
   a light-emitting-diode module;
   two fuse elements, connected respectively to said LED module, when current flowing through is greater than a current protection value, said two fuse elements are in an open circuit state, to cut off an over current and prevent it from flowing to said LED module; and
   a discharge protection element, connected to said LED module and said two fuse elements, said discharge protection element provide a current bypass route for said LED module,
   wherein said two fuse elements are said first fuse element and said second fuse element respectively, two ends of said first fuse element are connected respectively to a positive end of an AC power supply and said LED module; two ends of said second fuse element are connected respectively to said negative end of said AC power supply and said LED module; and two ends of said discharge protection element are connected respectively to said positive end and said negative end of said AC power supply.

7. The light-emitting-diode (LED) protection circuit as claimed in claim 6, wherein one end of said discharge protection element is connected between said first fuse element and said LED module, while other end is connected to said negative end of said AC power supply.

8. The light-emitting-diode (LED) protection circuit as claimed in claim 6, wherein one end of said discharge protection element is connected between said first fuse element and said LED module, while other end is connected between said second fuse element and said LED module.

9. The light-emitting-diode (LED) protection circuit as claimed in claim 1, wherein said discharge protection element is a mini surge absorber (BLSA).

10. The light-emitting-diode (LED) protection circuit as claimed in claim 6, wherein one end of said discharge protection elements is connected between said first fuse element and said positive end of said LED module, while other end is connected to said negative end of a DC power supply.

11. The light-emitting-diode (LED) protection circuit as claimed in claim 6, wherein said first fuse element is an ordinary fuse or a resettable electronic fuse.

12. The light-emitting-diode (LED) protection circuit as claimed in claim 6, wherein said discharge protection element is a mini surge absorber (BLSA).

13. The light-emitting-diode (LED) protection circuit as claimed in claim 6, wherein when said LED module is operated through using an AC power supply including a plurality of first polarity LEDs and a plurality of second polarity LEDs connected in parallel, with a polarity of said first polarity LED opposite to that of said second polarity LED.

14. The light-emitting diode (LED) protection circuit as claimed in claim 1, wherein said fuse elements are reusable electrical fuses.

15. The light-emitting diode (LED) protection circuit as claimed in claim 1, wherein when said current becomes normal, said reusable electrical fuse enters a short state.

16. The light emitting diode (LED) protection circuit as claimed in claim 1, wherein when a voltage drop across said discharge protection element is 0 volt, the circuit enters an over-voltage state;

wherein a current flows through said reusable electrical fuses to cut off the reusable electrical fuses.

17. The light-emitting diode (LED) protection circuit as claimed in claim 6, wherein said fuse elements are reusable electrical fuses.

18. The light-emitting diode (LED) protection circuit as claimed in claim 6, wherein when said current becomes normal, said reusable electrical fuse enters a short state.

19. The light emitting diode (LED) protection circuit as claimed in claim 6, wherein when a voltage drop across said discharge protection element is 0 volt, the circuit enters an over-voltage state;

wherein a current flows through said reusable electrical fuses to cut off the reusable electrical fuses.

\* \* \* \* \*